US006345374B1

United States Patent
Tsuda

(10) Patent No.: US 6,345,374 B1
(45) Date of Patent: Feb. 5, 2002

(54) CODE ERROR CORRECTING APPARATUS

(75) Inventor: Hiroyuki Tsuda, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/354,961

(22) Filed: Jul. 16, 1999

(30) Foreign Application Priority Data

Jul. 22, 1998 (JP) .......................................... 10-206547

(51) Int. Cl.⁷ ...................... G06F 11/00; H03M 13/00; G11C 29/00
(52) U.S. Cl. ...................... 714/746; 714/763; 714/769
(58) Field of Search .................................. 714/746, 752, 714/755, 756, 757, 758, 760, 761, 762, 763, 764, 765, 769; 360/31, 53

(56) References Cited

U.S. PATENT DOCUMENTS

| | | | | |
|---|---|---|---|---|
| 5,068,855 A | * | 11/1991 | Kashida et al. | 714/755 |
| 5,684,810 A | * | 11/1997 | Nakamura et al. | 714/755 |
| 5,745,506 A | * | 4/1998 | Yamashita et al. | 714/760 |
| 6,003,151 A | * | 12/1999 | Chuang | 714/752 |
| 6,004,028 A | * | 12/1999 | Bottomley | 714/758 |
| 6,058,499 A | * | 5/2000 | Sim | 714/755 |
| 6,167,548 A | * | 12/2000 | Yamakura | 714/763 |
| 6,243,845 B1 | * | 6/2001 | Tsukamizu | 714/769 |

* cited by examiner

*Primary Examiner*—Emmanuel L. Moise
(74) *Attorney, Agent, or Firm*—Sheridan Ross P.C.

(57) ABSTRACT

A code error correcting apparatus, which can be used in a CD digital audio system, reads data stored on a disc, performs error correction, and transfers the error corrected data to another device, such as a computer, at an increased playback speed. The apparatus includes a digital processor which receives and processes (EFM demodulation) the data read from the disc, and a latch circuit connected to the processor for receiving the processed data. A memory is connected to the latch circuit by way of an input interface circuit, for storing the latched data. An error correction circuit connected to the memory reads the stored data, performs error correction on the data, and stores the error corrected data back in the memory. An output interface circuit is connected to the memory and provides an interface to the memory for external devices. The digital processor, the latch circuit, the input interface and the error correction circuit are all formed on a single substrate.

8 Claims, 6 Drawing Sheets

CODE ERROR CORRECTING APPARATUS

BACKGROUND OF THE INVENTION

The present invention relates to a code error correcting apparatus and, more particularly, to a code error correcting apparatus that performs error correction on digital data read from a recording medium using an error correction code.

In compact disc read only memory (CD-ROM) systems, a digital audio CD is used as a read only memory (ROM) for storing digital data. To improve the reliability of digital data read from a CD, error correction is performed twice on the digital data. The first error correction is executed by a digital signal processor which is common to both an audio system and a CD-ROM system, and the second error correction is executed by a CD-ROM decoder of the CD-ROM system.

FIG. 1 is a schematic block diagram of a conventional CD-ROM system. The CD-ROM system includes a pickup 1, a pickup controller 3, an analog signal processor 4, a digital signal processor 5, a CD-ROM decoder 6, a buffer random access memory (RAM) 7 and a control microcomputer 8.

The pickup 1 irradiates light on a disc 2 to generate a voltage signal proportional to the intensity of the reflected light. The pickup controller 3 controls the read position of the pickup 1 with respect to the disc 2 so that the pickup 1 reads data from the disc 2 in the correct order. Servo control (CLV (constant linear velocity) control) to turn the disc 2 at a predetermined velocity is performed in accordance with the position control of the pickup 1. The servo control maintains the linear velocity of tracks on the disc 2 constant. Another servo control (CAV (constant angular velocity) control) is also performed.

The analog signal processor 4 receives the voltage signal from the pickup 1 and generates one frame of an Eight to Fourteen Modulation (EFM) data signal consisting of 588 bits. As shown in FIG. 2, the EFM data includes a 24-bit sync signal assigned to the beginning of each frame, 3-bit connection bit fields and 14-bit data bit fields which are alternately provided in each frame after the sync signal.

The digital signal processor 5 receives the EFM signal from the analog signal processor 4 and performs EFM demodulation on the signal for conversion to 8 bits from 14 bits. In this EFM demodulation, 8-bit subcode data is produced from the first data bit field following the sync signal, and 32-byte symbol data is produced from the remaining thirty-two pieces of data bit fields. Further, the 32-byte symbol data is subjected to Cross-Interleave Reed-Solomon Code (CIRC) demodulation to yield one frame of CD-ROM data consisting of 24 bytes. The first error correcting process is completed with this CIRC demodulation.

The CD-ROM data is handled in a block by block manner, each block of data consisting of 2352 bytes (24 bytes×98 frames). As shown in FIG. 3, normally (in mode 1), one block of data includes a sync signal (12 bytes), a header (4 bytes), user data (2048 bytes), an error detection code (EDC) (4 bytes) and an error correction code (ECC) (276 bytes). In one block of data, 2340, excluding the 12-byte sync signal, have previously undergone a scrambling process and are reproduced by a descrambling process. This descrambling process is performed to prevent a pattern similar to a sync signal from entering into one block of data.

The CD-ROM decoder 6 receives the CD-ROM data from the digital signal processor 5 and performs error correction in accordance with the ECC and error detection in accordance with the EDC and then provides the processed CD-ROM data to a host computer. Normally, therefore, after an error in the data is corrected in accordance with the ECC, it is checked in accordance with the EDC to determine if the error was properly corrected. When the error has not been corrected properly, error correction is carried out again in accordance with the ECC, or an error flag is affixed to the CD-ROM data containing the error code.

The buffer RAM 7 is connected to the CD-ROM decoder 6 and temporarily stores the CD-ROM data in a block by block manner. Since the ECC and EDC are included in one block of CD-ROM data, the CD-ROM decoder 6 requires at least one block of CD-ROM data. Therefore, the buffer RAM 7 stores one block of CD-ROM data for the CD-ROM decoder 6.

The control microcomputer 8 may be a one-chip microcomputer having an internal ROM and an internal RAM. The control microcomputer 8 controls the operation of the CD-ROM decoder 6 in accordance with a control program stored in the ROM. At the same time, the control microcomputer 8 receives command data from the host computer and subcode data from the digital signal processor 5 and temporarily stores the command and subcode data in the internal RAM. The control microcomputer 8 controls the operations of the individual circuits 3, 4, 5, 6 in accordance with the command data (i.e., commands from the host computer) so that the host computer can receive the desired CD-ROM data from the CD-ROM decoder 6.

The analog signal processor 4, the digital signal processor 5, the CD-ROM decoder 6, the buffer RAM 7, and the control microcomputer 8 respectively consist of independent integrated circuits. The CD-ROM decoder 6 receives the CD-ROM data from the digital signal processor 5 and serially outputs the CD-ROM data to the host computer. This allows the integrated circuits to have less input and output pins and makes the wiring configuration less complicated. For example, as shown in FIG. 4, the digital signal processor 5 transfers 16-bit CD-ROM data to the CD-ROM decoder 6 in order of MSB to LSB (or LSB to MSB). This data transmission is performed synchronously with a clock signal CK generated by the EFM signal. A channel identification signal LR which is inverted in response to the end of each data is also transferred synchronously with the CD-ROM data. The CD-ROM decoder 6 receives the CD-ROM data by detecting a rising edge and falling edge of the channel identification signal LR while identifying the position of the MSB or LSB of the CD-ROM data.

When the play back speed of the disc 2 is increased, the frequency of the EFM signal is increased and consequently the frequency of the clock signal CK is also increased. This affects the serial transmission of the CD-ROM data. That is, the high frequency clock signal CK causes a circuit operation delay of the digital signal processor 5 and a slight timing lag between the CD-ROM data and the clock signal CK. This timing lag makes it difficult the CD-ROM decoder 6 to receive the CD-ROM data correctly.

SUMMARY OF THE INVENTION

It is an object of the present invention to provide a code error correcting apparatus which transfers the CD-ROM data correctly.

In one aspect of the present invention, a code error correcting apparatus is provided that includes a digital processor for performing a predetermined process on digital data and generating an identification signal synchronized with the output timing of the digital data. A latch circuit is connected to the digital processor and latches a plurality of processed digital data in accordance with the identification signal. An input interface circuit is connected to the latch circuit and an external memory circuit, receives the plurality of processed digital data from the latch circuit and stores the plurality of digital data in the external memory circuit. A code error correcting circuit is connected to the external memory circuit, receives the plurality of processed digital data from the external memory circuit, performs a code error correction process on the plurality of digital data, and stores the corrected data back in the external memory circuit. An output interface circuit is connected to the external memory circuit and reads the plurality of corrected processed digital data from the external memory circuit. The digital processor, the latch circuit, the input interface circuit and the code error correcting circuit are integrated on a single semiconductor substrate.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
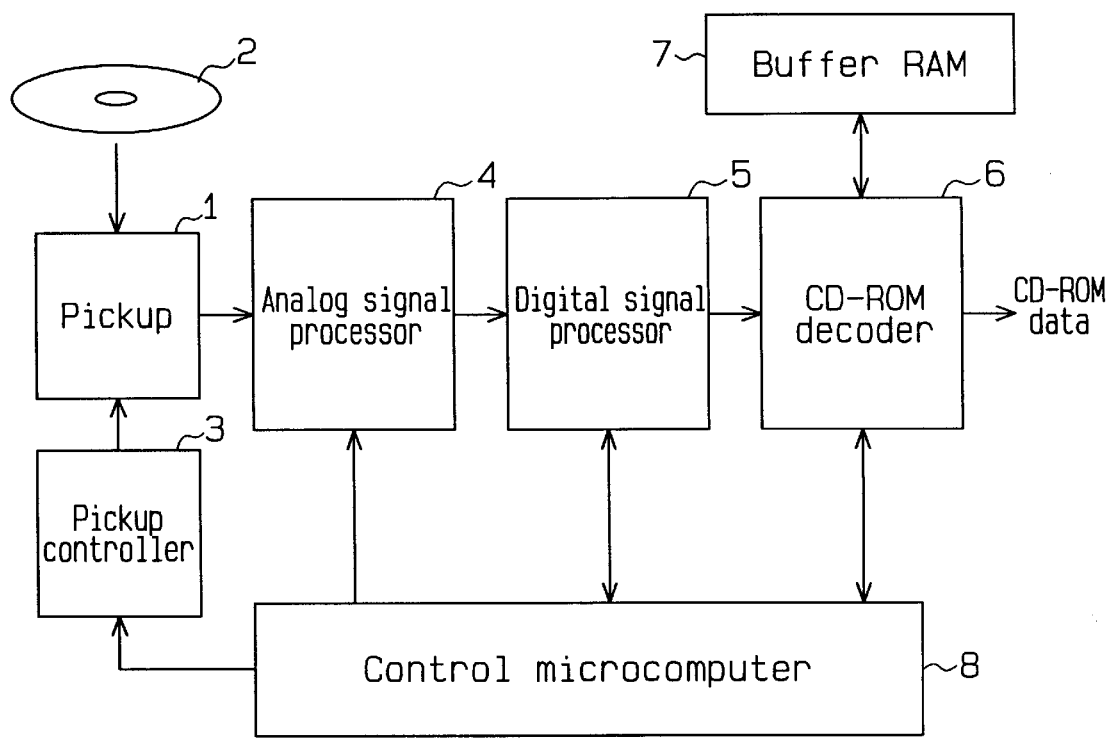
FIG. 1 is a schematic block diagram of a conventional CD-ROM system.
Figure 2:
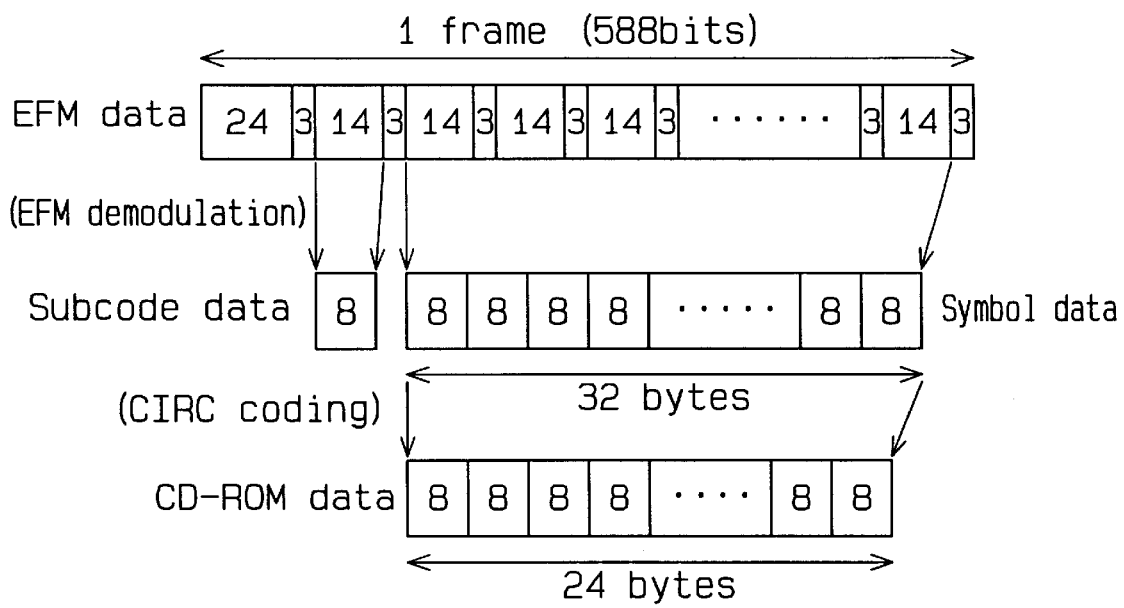
FIG. 2 is a format diagram of data generated by the CD-ROM system of FIG. 1.
Figure 3:
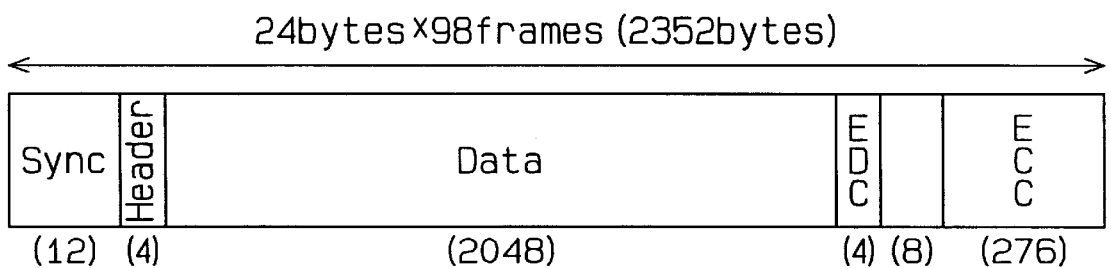
FIG. 3 is a format diagram of CD-ROM data generated by the CD-ROM system of FIG. 1.
Figure 4:
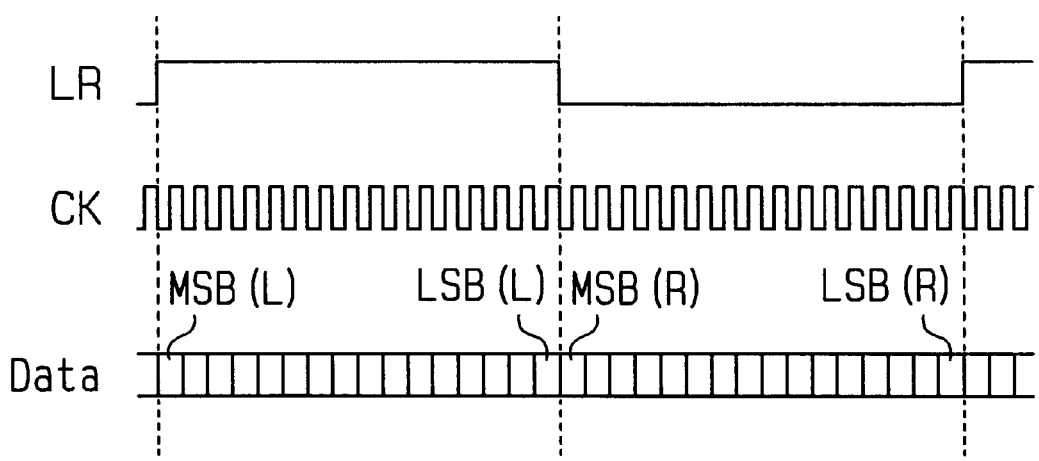
FIG. 4 is a timing diagram of a data transfer of the CD-ROM system of FIG. 1.
Figure 5:
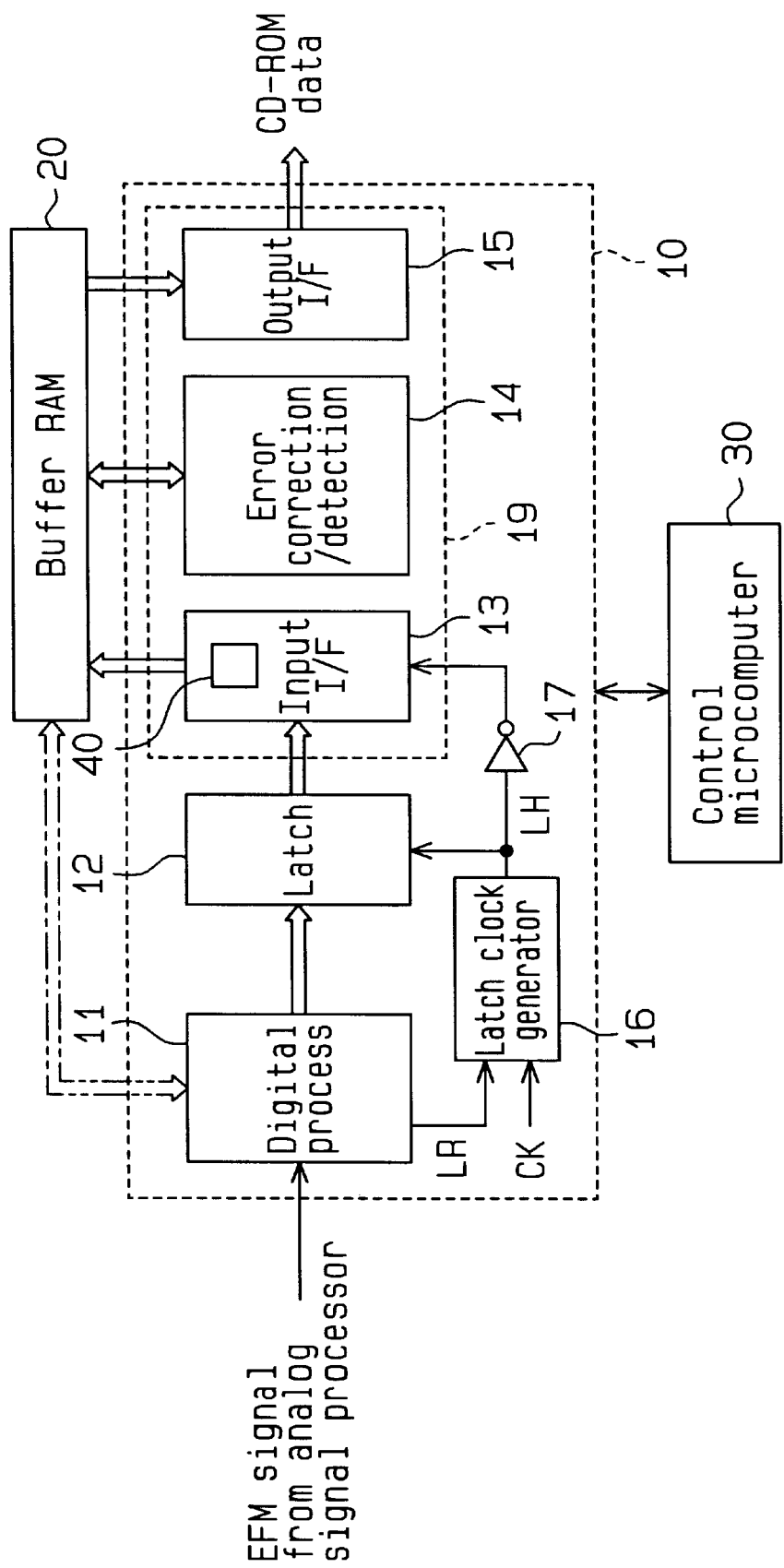
FIG. 5 is a schematic block diagram of a code error correcting apparatus according to one embodiment of the present invention.

FIG. 5 is a schematic block diagram of a code error correcting apparatus 10 according to one embodiment of the present invention. The code error correcting apparatus 10 includes a digital processor 11, a latch circuit 12, an input interface circuit 13, an error correcting and detecting circuit 14, an output interface circuit 15 and a latch clock generator 16. The code error correcting apparatus 10 including the circuits 11 to 16 is preferably integrated on a single semiconductor substrate and connected to a control microprocessor 30. The input interface circuit 13, the error correcting and detecting circuit 14, and the output interface circuit 15 are connected to a buffer RAM 20. The control microprocessor 30 and the buffer RAM 20 are preferably integrated on another single semiconductor substrate. The input interface circuit 13, the error correcting and detecting circuit 14, and the output interface circuit 15 comprise a CD-ROM decoder 19.

The digital processor 11 receives an EFM signal from an analog signal processor and generates CD-ROM data by performing processes such as EFM demodulation and CIRC decoding on the EFM signal. At the same time, the digital processor 11 generates a channel identification signal LR indicating the switching timing of the CD-ROM data in accordance with each process time. The digital processor 11 processes each 8-bit symbol data, then transfers the CD-ROM data to the latch circuit 12 in units of 16-bits.

Figure 6:
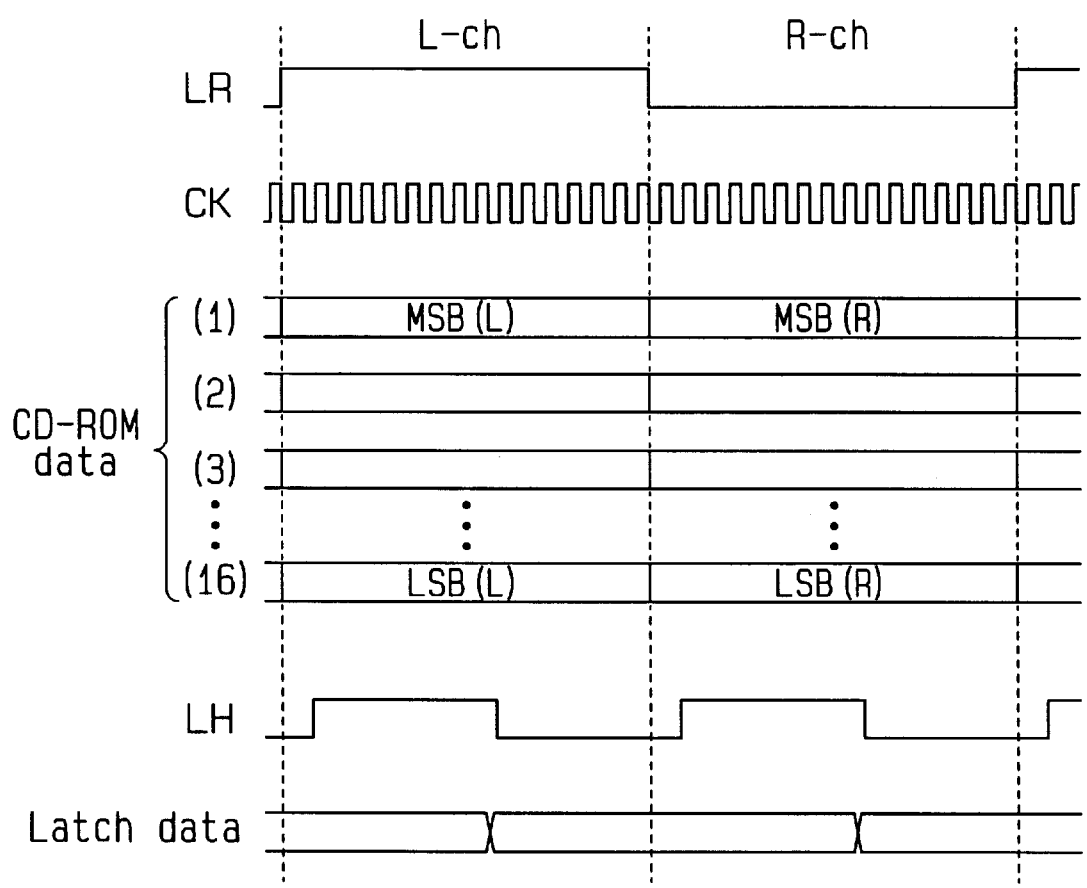
FIG. 6 is a timing diagram of the flow of data of the code error correcting apparatus of FIG. 5.

The latch circuit 12 receives the CD-ROM data from the digital processor 11 and latches the CD-ROM data for a predetermined time in accordance with a latch clock signal LH which will be discussed later. As shown in FIG. 6, the latch circuit 12 latches plural pieces of 16-bit CD-ROM data in parallel every one cycle of the latch clock signal LH.

The input interface circuit 13 receives the latched plural pieces of CD-ROM data continuously from the latch circuit 12 in a block by block manner (each block of data consisting of 24 bytes×98 frames) and stores one block of the CD-ROM data into the buffer RAM 20. More particularly, the input interface circuit 13 includes a first-in first-out (FIFO) type buffer 40 connected in parallel with the latch circuit 12. The buffer 40 temporarily stores the CD-ROM data from the latch circuit 12 and transfers the CD-ROM data to the buffer 20 in accordance with a predetermined timing scheme.

The input interface circuit 13 descrambles 2340 bytes of scrambled data, excluding the 12-byte sync signal, in one block of CD-ROM data and generates one block of descrambled CD-ROM data prior to storing the data in the RAM 20.

The error correcting and detecting circuit 14 receives the descrambled CD-ROM data stored in the buffer RAM 20 in a block by block manner and performs error correction on the descrambled CD-ROM data in accordance with an error correction code (ECC) included in the CD-ROM data. In the ECC, data with an error stored in the buffer 20 is replaced with correct data. The error correcting and detecting circuit 14 further detects if the CD-ROM data has an error code in accordance with an error detection code (EDC) included in the CD-ROM data. If an error code is detected, the error correction process is not repeated and an error flag is affixed to the CD-ROM data containing the error code.

The output interface circuit 15 reads the error-corrected CD-ROM data from the buffer RAM 20 in accordance with a command from an external host computer (not shown) to provide the CD-ROM data to the host computer. The output interface circuit 15 further receives a control command from the host computer and supplies the control command to the control microcomputer either by sending it directly or after temporarily storing it in the buffer RAM 20.

The latch clock generator 16 receives a clock signal CK synchronized with an EFM signal and a channel identification signal LR from the digital processor 11 and generates a latch clock signal LH. As shown in FIG. 6, the latch clock signal LH has a period equal to about a half period of the channel identification signal LR and it is preferably set to change (for example, it falls) levels at approximately the middle point between the rise and fall of the channel identification signal LR. The latch clock signal LH is supplied to the latch circuit 12 and the latch circuit 12 latches the CD-ROM data in response to the falling edge of the latch clock signal LH. The latch clock signal LH is also supplied to the input interface circuit 13 via an inverter 17, and the buffer 40 of the input interface circuit 13 temporarily buffers the CD-ROM data latched by the latch circuit 12 in accordance with the inverted latch clock signal LH. In this embodiment, the duty ratio of the latch clock signal LH is set to 1/2. Therefore, the timing of the buffer 40 is set at the middle point of each latch timing of the latch circuit 12.

Returning to FIG. 5, the buffer RAM 20 preferably has a capacity to store plural blocks of the CD-ROM data and stores the CD-ROM data from the input interface circuit 13 for a predetermined time. Then, the CD-ROM data with any necessary portions thereof rewritten by the error correcting and detecting circuit 14 is read from the buffer RAM 20 and supplied to the output interface circuit 15. The buffer RAM 20 may be connected to the digital processor 11. In this case, the buffer RAM 20 temporarily stores data as required for operation of the digital processor 11. The buffer RAM 20 may be integrated on the same semiconductor substrate as the code error correcting apparatus 10.

The control microcomputer 30 controls the operation of each of the circuits 11 to 16 of the code error correcting apparatus 10 in accordance with a control program stored in an internal ROM. The control microcomputer 30 may also control the operation of each of the circuits 11 to 16 of the code error correcting apparatus 10 in accordance with control commands received from the host computer.

In the code error correcting apparatus 10 of the present embodiment, the CD-ROM data is transferred from the digital processor 11 via the latch circuit 12 to the input interface circuit 13. Therefore, 16-bit CD-ROM data is transferred from the digital processor 11 to the input interface circuit 13 once in one period of the latch clock signal LH. At this moment, the latch circuit 12 latches the CD-ROM data from the digital processor 11 at the middle point of each changing position of the channel identification signal LR. The buffer 40 of the input interface circuit 13 buffers the CD-ROM data latched by the latch circuit 12 at the middle point of each latch timing of the latch circuit 12. Accordingly, the CD-ROM data is transferred correctly using a high frequency clock signal CK. That is, even when the latch timing or buffer timing is shifted slightly because of the high frequency clock signal, the CD-ROM data is transferred correctly. Since the digital processor 11 and input interface circuit 13 are integrated on a single semiconductor substrate, it is easy to connect both circuits 11 and 13 in parallel with the latch circuit 12.

Further, since the digital processor 11 and CD-ROM decoder are integrated on a single semiconductor substrate, the circuit configuration becomes much less complicated, and the speed of data transmission from the digital processor 11 to the CD-ROM decoder 19 is increased. This also reduces the effect of jitter included in the clock signal CK and stabilizes the circuit operation.

The latch timing of data by the latch circuit 12 may be set between respective changing positions (preferably approximately the respective middle points) of the channel identification signal LR. Therefore, setting the latch timing becomes easy.

The high speed data transmission is realized by the parallel transmission of the CD-ROM data without using a high frequency clock signal. Accordingly, the radiation noise caused by a high frequency clock signal is suppressed and the power consumption is reduced.

Figure 7:
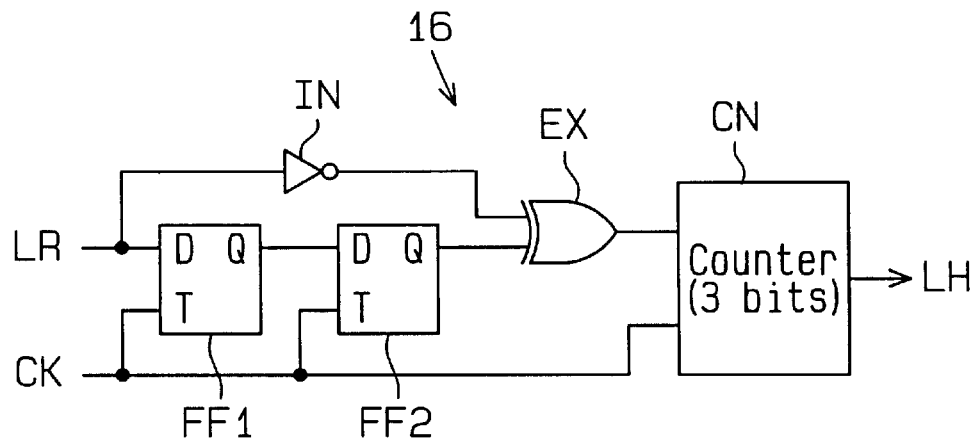
FIG. 7 is a schematic block diagram of a latch clock generator of the code error correcting apparatus of FIG. 5.

FIG. 7 is a schematic block diagram of the latch clock generator 16. The CD-ROM data is transferred in units of 16-bits.

The latch clock generator 16 includes first and second flip-flops FF1 and FF2, an inverter IN, an exclusive OR logic gate EX, and a counter CN.

The first and second flip-flops FF1 and FF2 are connected in series and each has a timing input T for receiving the clock signal CK. When the channel identification signal LR is supplied to a data input D of the first flip-flop FF1, the first and second flip-flops FF1 and FF2 shift the channel identification signal LR two bits in accordance with the clock signal CK. Therefore, the first and second flip-flops FF1 and FF2 compose a 2-bit shift register.

The exclusive OR logic gate EX includes a first input terminal connected to a data output terminal Q of the second flip-flop FF2, a second input terminal connected via an inverter IN to the channel identification signal LR, and an output terminal connected to the counter CN.

The counter CN is, for example, a 3-bit binary counter and generates the latch clock signal LH by counting the clock signal CK in response to an output signal of the exclusive OR logic gate EX. That is, the counter CN resets the counter values in response to the rising of the output signal of the exclusive OR logic gate EX and, at the same time, raises the latch clock signal LH and then drops the latch clock signal LH after counting the clock signals CK for 8 cycles.

Figure 8:
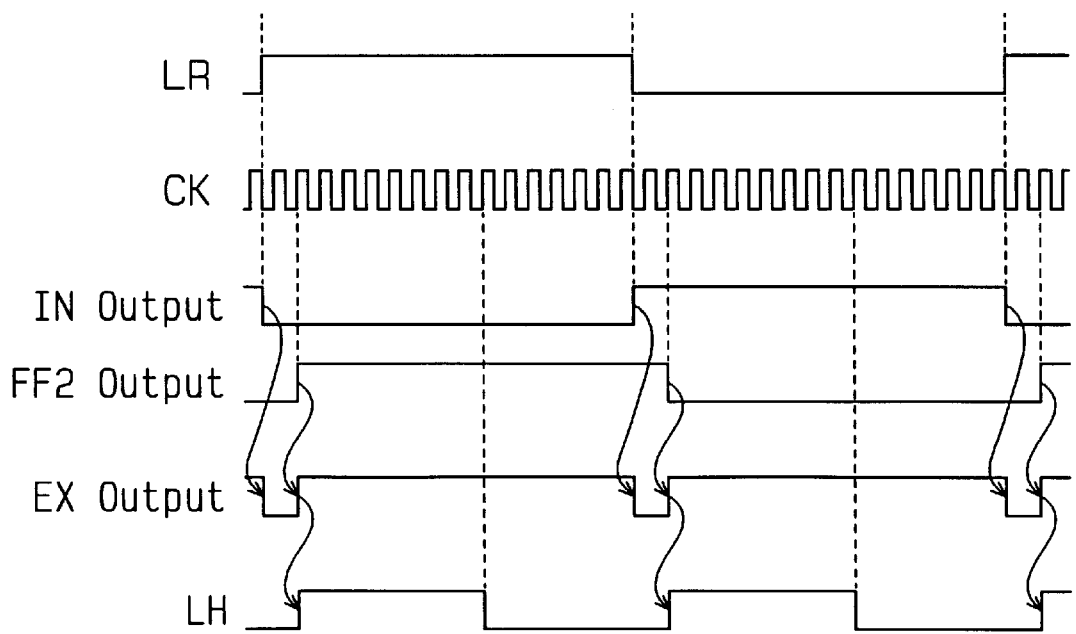
FIG. 8 is a timing diagram of the flow of data of the latch clock generator of FIG. 7.

FIG. 8 shows the operation of the latch clock generator 16. The channel identification signal LR is inverted by the inverter IN and delayed by 3/2 cycles of the referential clock signal CK by the second flip-flop FF2. The exclusive OR logic gate EX generates an output signal having the low level while the output signal of the inverter IN and the second flip-flop FF2 coincide each other, and having the high level when both signals are different. Therefore, the output signal of the exclusive OR logic gate EX rises at the changing point of the channel identification signal LR and falls after the 3/2 cycles of the clock signal CK have passed. The counter CN starts counting in response to the rise of the exclusive OR logic gate EX output signal and generates a latch clock signal LH, which rises with the rising of the exclusive OR logic gate EX and falls after eight cycles of the referential clock signal CK have passed. That is, the latch clock signal LH having 1/2 periods of the channel identification signal LR and having the latch timing at the middle point of each changing position of channel identification signal LR is generated.

It should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope and equivalence of the appended claims.

What is claimed is:

1. A code error correcting apparatus comprising:
   a digital processor for performing a predetermined process on digital data and generating an identification signal synchronized with the output timing of the digital data;
   a latch circuit connected to said digital processor, for latching a plurality of processed digital data in accordance with the identification signal;
   an input interface circuit connected to said latch circuit and an external memory circuit, for receiving the plurality of processed digital data from said latch circuit and storing the plurality of digital data in the external memory circuit;
   a code error correcting circuit connected to the external memory circuit, for receiving the plurality of processed digital data from the external memory circuit, performing a code error correction process on the plurality of digital data, and overwriting the corrected data into the external memory circuit; and an output interface circuit connected to the external memory circuit, for reading the plurality of corrected processed digital data from the external memory circuit, wherein said digital processor, said latch circuit, said input interface circuit and said code error correcting circuit are integrated on a single semiconductor substrate.

2. The apparatus of claim 1, wherein the identification signal has a predetermined period, the apparatus further comprises a latch clock generator connected between said digital processor and said latch circuit for generating a latch clock signal having a half period of the predetermined period of the identification signal.

3. The apparatus of claim 2, wherein the identification signal rises and falls by the predetermined period, the latch clock circuit has a changing position between the first rising edge and the next falling edge of the identification signal, and said latch circuit latches the plurality of processed digital data in response to the changing position of said latch clock circuit.

4. The apparatus of claim 3, wherein the changing position of the latch clock circuit is located approximately at the middle point between the first rising edge and the next falling edge of the identification signal.

5. The apparatus of claim 2, wherein the input interface circuit includes a buffer for storing the plurality of processed digital data from said latch circuit in accordance with the latch clock signal.

6. The apparatus of claim 2, wherein said latch clock generator includes:
a shift register for receiving a clock signal and the identification signal from said digital processor and shifting the identification signal in accordance with the clock signal;

an inverter for receiving the identification signal and generating an inverted identification signal;

an exclusive OR logic gate connected to said shift register and said inverter, for performing an exclusive OR operation on the shifted identification signal and the inverted identification signal; and a counter connected to said exclusive OR logic gate, for counting the clock signal in response to said exclusive OR logic gate output signal and generating the latch clock signal.

7. The apparatus of claim 1, wherein the external memory circuit is integrated on the same substrate as said digital processor, said latch circuit, said input interface circuit and said code error correcting circuit.

8. The code error correcting apparatus of claim 1, wherein said output interface circuit is also integrated on the single semiconductor substrate.

* * * * *